(12) United States Patent
Hashino (10) Patent No.: US 7,978,284 B2
(45) Date of Patent: Jul. 12, 2011

(54) ILLUMINATION DEVICE AND LIQUID CRYSTAL DISPLAY APPARATUS

(75) Inventor: Naruo Hashino, Matsumoto (JP)

(73) Assignee: Epson Imaging Devices Corporation (JP)

( * ) Notice: Subject to any disclaimer, the term of this patent is extended or adjusted under 35 U.S.C. 154(b) by 1138 days.

(21) Appl. No.: 11/694,114

(22) Filed: Mar. 30, 2007

(65) Prior Publication Data
US 2009/0322983 A1 Dec. 31, 2009

(30) Foreign Application Priority Data

Apr. 3, 2006 (JP) ................................. 2006-101625

(51) Int. Cl.
*G02F 1/1335* (2006.01)
(52) U.S. Cl. ............. 349/61; 349/58; 349/110; 349/122
(58) Field of Classification Search ..................... 349/58, 349/110, 122, 150, 61
See application file for complete search history.

(56) References Cited

U.S. PATENT DOCUMENTS

| 7,495,738 | B2 * | 2/2009 | Okuda | 349/150 |
| 7,708,449 | B2 * | 5/2010 | Eda | 362/631 |
| 7,760,284 | B2 * | 7/2010 | Murase | 349/58 |
| 2007/0222911 | A1 * | 9/2007 | Murase | 349/58 |
| 2009/0103282 | A1 * | 4/2009 | Itaya | 362/97.1 |
| 2009/0308638 | A1 * | 12/2009 | Cho et al. | 174/254 |

FOREIGN PATENT DOCUMENTS

| JP | 2003-156739 | 5/2003 |
| JP | 2004-071802 | 3/2004 |

* cited by examiner

*Primary Examiner* — Sarah Hahm
(74) *Attorney, Agent, or Firm* — Harness, Dickey & Pierce, P.L.C.

(57) ABSTRACT

An illumination device comprising: a wired board having flexibility and including a light source member mounted on one of principal planes; a light-shielding member disposed so as to cover at least part of the other principal plane of the wired board on the opposite side from the one principal plane and having at least partly a light-shielding property; a fixing member having first and second sticking surfaces to which the wired board and the light-shielding member are stuck respectively, a first adhesive layer being interposed between the one principal plane of the wired board and the first sticking surface of the fixing member, having an adhesive property with respect to both of the one principal plane of the wired board and the first sticking surface, and having a first adhesive force with respect to the one principal plane, and a second adhesive layer being disposed on a surface opposing the fixing member of the light-shielding member, and having a portion having an adhesive property with respect to both of the light-shielding member and the second sticking surface and a portion having an adhesive property for both of the light-shielding member and the other principal plane of the wired board, wherein the second adhesive layer includes a non-adhesive portion having no adhesive property with respect to the other principal plane or a low-bond strength adhesive portion having a second adhesive force lower than the first adhesive force at least in a portion having an adhesive force for both the light-shielding member and the other principal plane of the wired board.

8 Claims, 7 Drawing Sheets

ILLUMINATION DEVICE AND LIQUID CRYSTAL DISPLAY APPARATUS

The entire disclosure of Japanese Patent Application No. 2006-101625, filed Apr. 3, 2006 is expressly incorporated by reference herein.

BACKGROUND

1. Technical Field

The present invention relates to an illumination device and a liquid crystal display apparatus, and more specifically, to an illumination device and a liquid crystal display apparatus including a flexible wired board having a light source member mounted one of principal planes thereof.

2. Related Art

In general, an illumination device which outputs light emitted from a light source to a predetermined direction by guiding the light by a light guide member formed of translucent material such as acrylic is known as an illumination device which outputs light emitted from a light emitting diode (hereinafter referred to as "LED), which corresponds to the light source, to a predetermined direction.

Such illumination device is used, for example, as a backlight unit of a side light type in the liquid crystal display apparatus. The backlight unit of the side light type is mainly configured by disposing LEDs on the side surfaces of a light guide panel of a flat plate shape, which corresponds to a light guide member, and outputs light emitted from the LEDs and incoming from the side surfaces of the light guide panel through a principal plane as an exit plane in a direction of the thickness of the light guide panel (in the direction of the normal line of the principal plane of the light guide panel). An optical sheet such as a diffuser panel and a prism sheet is disposed on the exit plane of the light guide panel to diffuse light outputted from the light guide panel substantially evenly into a plane.

In the liquid crystal display apparatus, a transmissive liquid crystal panel is disposed on the side of an observer of the backlight unit, so that light outputted from the backlight unit is modulated by the transmissive liquid crystal panel and is outputted toward the observer, so that display on the liquid crystal display apparatus is achieved.

In the backlight unit as the illumination device as described above, a flexible printed circuit board (hereinafter, referred to as "FPC") which is a flexible wired board having an LED mounted on a mounting surface thereof is used for the purpose of downsizing and weight reduction. The FPC is stuck to a light guide panel or a casing via adhesive agent such as a double-faced adhesive tape (double-faced adhesive sheet). Since the FPC is partly translucent and has a light transmitting property, light emitted from the LEDs passes through the FPC, and outputted from different positions from an exit plane of illumination light of the backlight unit as stray light. With such stray light, uneven distribution is generated in luminance of the backlight unit, and hence the display quality of the liquid crystal display apparatus is lowered.

In order to prevent the light emitted from the LEDs from passing through and leaking from the FPC, for example, in a light source of a backlight in a liquid crystal display apparatus disclosed in Japanese Unexamined Patent Application Publication No. 2003-156739, a light-shielding sheet having a light-shielding property is stuck and fixed to the surface of the FPC on the opposite side from the surface on which the LEDs are mounted via adhesive agent such as double-faced adhesive tape.

As disclosed in Japanese Unexamined Patent Application Publication No. 2003-156739, when the light-shielding sheet is stuck on the surface of the FPC with adhesive agent, when the FPC comes apart from the light-shielding sheet, a bending stress is applied to the FPC. For example, when defects such as uneven luminance, entry of foreign substances, scratch or deformation of members caused by displacement of the fixed position of the LEDs are found after the FPC and the light-shielding sheet is stuck together, it is necessary to perform rework to peel off the light-shielding sheet stuck on the FPC, and then repair the failed portions. When peeling off the light-shielding sheet stuck on the FPC in this manner, the FPC stuck to the casing of the backlight unit or the light guide panel comes apart as well by being pulled by the light-shielding sheet.

At this time, since the FPC has flexibility, the FPC is deformed according to a peeling force. However, since the LEDs mounted on the FPC have no flexibility, if the FPC is deformed, there is a problem such that an excessive stress is applied to joint portions between terminals of the LEDs and the FPC by soldering, and the joint portions may be separated or cracked.

In the case in which separation or cracking is occurred at the joint portions with respect to the terminals of the LEDs, it is necessary to replace the FPC. Even when the cracking does not occur, application of the excessive stress on the terminals of the LEDs must be avoided since it may cause defective illumination of the LEDs.

SUMMARY

An advantage of some aspects of the invention is an illumination device and a liquid crystal display apparatus in which application of an excessive stress on joint portions between terminals of LEDs and an FPC during rework is avoided.

An illumination device according to an aspect of the invention is an illumination device including: a wired board having flexibility and including a light source member mounted on one of principal planes; a light-shielding member disposed so as to cover at least part of the other principal plane of the wired board on the opposite side from the one principal plane and having at least partly a light-shielding property; a fixing member having first and second sticking surfaces to which the wired board and the light-shielding member are stuck respectively, a first adhesive layer being interposed between the one principal plane of the wired board and the first sticking surface of the fixing member, having an adhesive property with respect to both of the one principal plane of the wired board and the first sticking surface, and having a first adhesive force with respect to the one principal plane, and a second adhesive layer being disposed on a surface opposing the fixing member of the light-shielding member, and having a portion having an adhesive property with respect to both of the light-shielding member and the second sticking surface and a portion having an adhesive property for both of the light-shielding member and the other principal plane of the wired board, wherein the second adhesive layer includes a non-adhesive portion having no adhesive property with respect to the other principal plane or a low-bond strength adhesive portion having a second adhesive force lower than the first adhesive force at least in a portion having an adhesive force for both the light-shielding member and the other principal plane of the wired board.

In this configuration, the problem such that when peeling off the light-shielding member from the fixing member for rework, the wired board is pulled by the adhesive force of the light-shielding member and hence rises from the first sticking surface, or comes apart together with the light-shielding member is avoided. Therefore, the wired board is not bent daring rework, and hence application of an excessive stress to the joint portions between the terminals of the LEDs as the light source members mounted on the wired board and the wired board is avoided.

Preferably, the area in which the non-adhesive portion or the low-bond strength adhesive portion of the second adhesive layer is formed is disposed so as not to overlap with the area in which the first adhesive layer is formed when viewed in the direction of the normal line of the other principal plane of the wired board.

In this configuration, since the surface area of the second adhesive layer having a low adhesive force may be reduced, the adhesive force between the wired board and the light-shielding member may be increased while preventing the wired board from being bent during rework. Therefore, fixation of the liquid crystal panel to be fixed to the illumination device via the light-shielding member may be advantageously enhanced.

Preferably, the second adhesive layer includes a light-shielding adhesive layer having an adhesive property and being formed on the surface of the light-shielding member which opposes the fixing member, and a low-bond strength adhesive layer in the form of a low-bond strength adhesive sheet as a sheet-type member being interposed at least partly in an area where the light-shielding adhesive layer and the other principal plane of the wired board are opposed to each other and being formed, with the non-adhesive portion or the low-bond strength adhesive portion on the surface opposing the other principal plane of the wired board.

In this configuration, the second adhesive layer may be configured by sticking the low-bond strength adhesive sheet as the sheet-type member formed with the low-bond strength adhesive portion or the non-adhesive portion onto the light-shielding adhesive layer, and hence the invention may be applied to the illumination device in the related art.

A liquid crystal display apparatus according to another aspect of the invention is characterized by the provision of the illumination apparatus described above.

According to the configuration as described above, the number of defective units to be wasted due to failed rework during the manufacturing process may be reduced and, consequently, the liquid crystal display apparatus may be manufactured at low cost.

BRIEF DESCRIPTION OF THE DRAWINGS

The invention will be described with reference to the accompanying drawings, wherein like numbers reference like elements.

DESCRIPTION OF EXEMPLARY EMBODIMENTS

Figure 1:
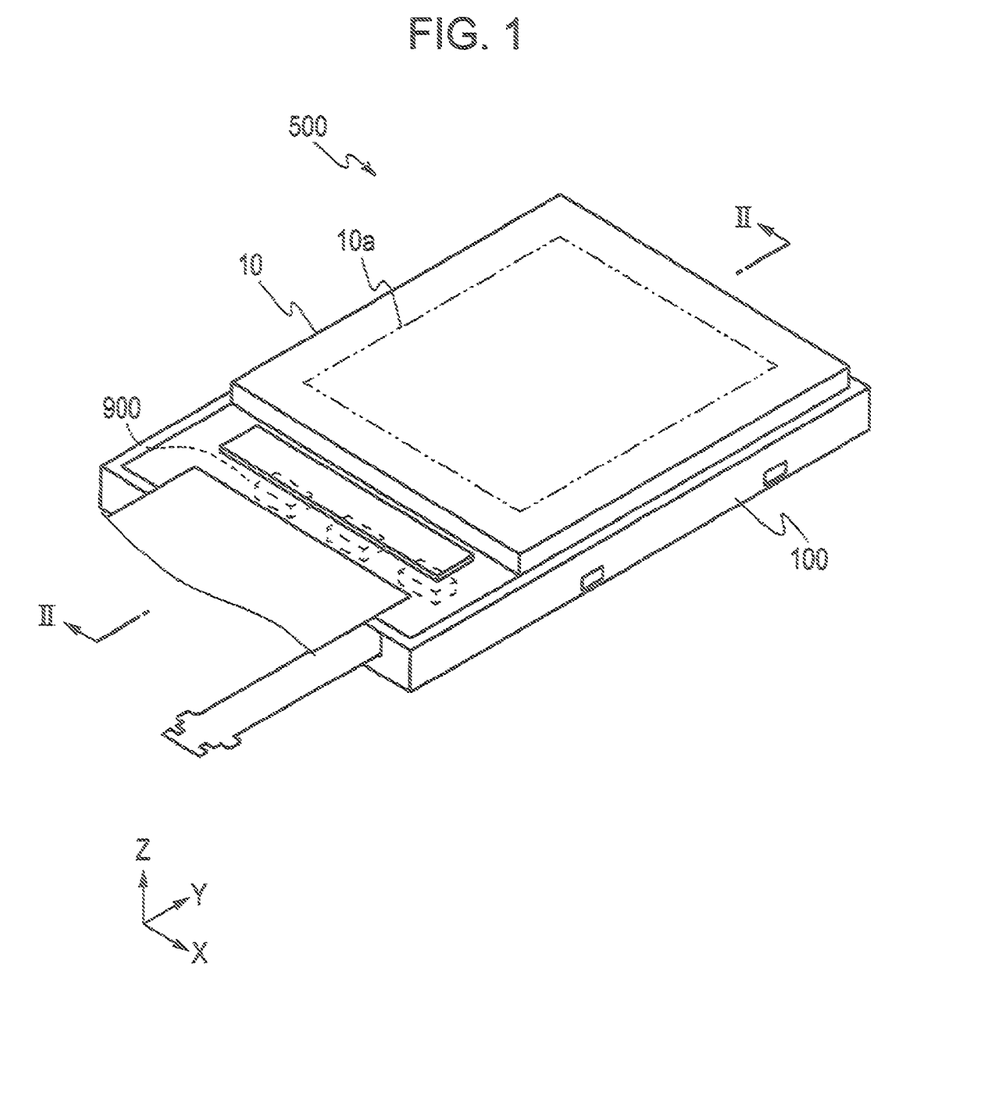
FIG. 1 is a perspective view of a liquid crystal display apparatus.
Figure 2:
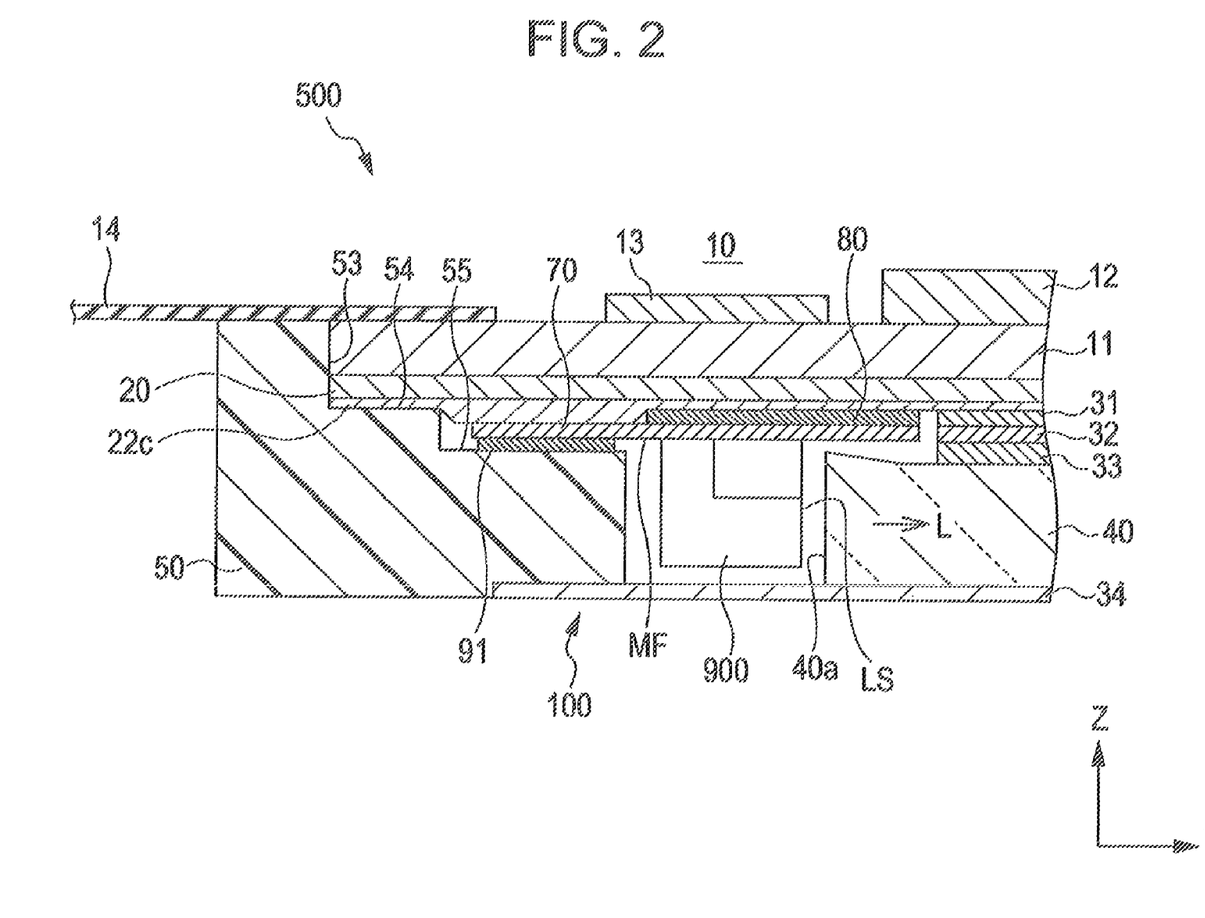
FIG. 2 is a cross-sectional view taken along the line II-II in FIG. 1.
Figure 3:
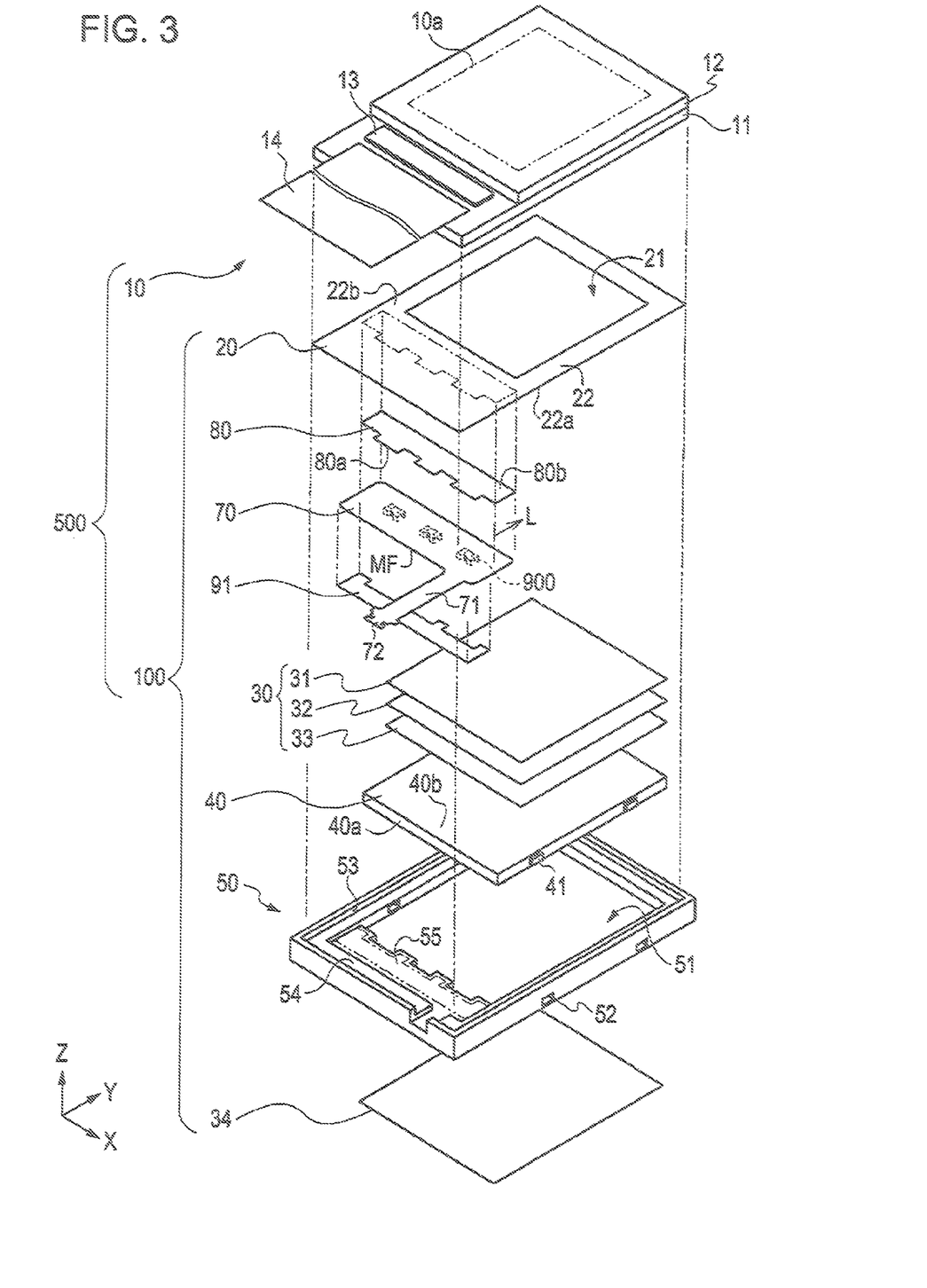
FIG. 3 is an exploded perspective view of the liquid crystal display apparatus.

Referring now to the drawings, an example in which an aspect of the invention is applied as a liquid crystal display apparatus and a backlight unit thereof will be described. In the drawings used for description given below, the contraction scales of respective members are changed as needed in order to ensure the visibility of the respective member in the drawing. FIG. 1 is a perspective view of a liquid crystal display apparatus 500. FIG. 2 is a cross-sectional view taken along the line II-II in FIG. 1. FIG. 3 is an exploded perspective view of the liquid crystal display apparatus 500.

The liquid crystal display apparatus 500 in this embodiment is a so-called transmissive liquid crystal display apparatus including a transmissive liquid crystal panel 10, and a backlight unit 100 as an illumination device having light emitting diodes (hereinafter referred to as "LEDs") as light source members.

The liquid crystal display apparatus 500 in this embodiment includes the liquid crystal panel 10 and the backlight unit 100. As shown in FIG. 3, the liquid crystal panel 10 includes a first substrate 11 and a second substrate 12 formed, for example, of glass or quartz, and liquid crystal, not shown, sandwiched therebetween, and displays an image in a rectangular image display area 10a by modulating light entering the image display area 10a from the first substrate 11 side by changing alignment of the liquid crystal and outputting from the second substrate 12 side.

On the other hand, the backlight unit 100 as the illumination device in this embodiment is a device to distribute light emitted from LEDs 900 substantially evenly in a plane in a rectangular area which is larger than the image display area 10a of the liquid crystal panel 10 and output the light toward the liquid crystal panel 10 as illumination light.

In the following description, an axis extending in parallel with the longitudinal direction of the image display area 10a in a plane in parallel with the surface of the second substrate 12 is referred to as "Y-axis", and a direction orthogonal to the Y-axis and parallel with the short side is referred to as "X-axis". An axis extending in parallel with the normal line of the surface of the second substrate 12 is referred to as "Z-axis". A view of respective members of the liquid crystal display apparatus 500 from a direction parallel to the Z-axis and from the second substrate 12 side of the liquid crystal panel 10 is referred to as "plan view".

The liquid crystal panel 10 in this embodiment is a liquid crystal panel of TFT active matrix drive system having a drive circuit integrated therein. On the surface of the first substrate 11 on the liquid crystal side, a TFT and scanning lines are formed as pixel switching positive elements, and an alignment film is formed on the pixel electrode after having formed wiring such as data lines. On the other hand, on the surface of the second substrate 12 on the liquid crystal side, and an opposed electrode is formed and an alignment film is formed on the uppermost layer thereof. The liquid crystal assumes a predetermined alignment according to a voltage applied to a pair of the alignment films. According to the alignment of the liquid crystal, polarization of light entering from the first substrate 11 side and outgoing from the second substrate 12 side changes.

On the first substrate 11 on the light incident side and the second substrate 12 on the light exit side, polarizing films, phase-difference films, and polarizing plate (not shown) are arranged in predetermined directions depending on the operation mode such as TN (Twisted Nematic) mode, STN (Super TN) mode, D-STN (Double STN) mode, VA (vertical alignment) mode, or depending on whether it is the normally white mode or the normally black mode.

In this embodiment, the liquid crystal panel 10 employs a transmissive liquid crystal panel of TFT active matrix drive system. However, the liquid crystal panel 10 may be configured in an arbitrary drive system and lighting system. For example, the liquid crystal drive system may be a simple matrix drive system, or the lighting system may be a transflective system. When the drive system of an active matrix system is employed in the liquid crystal panel, the liquid crystal panel may be the one employing a TFD as a positive element.

The first substrate 11 has a portion extending to one side in the direction parallel with the Y-axis when viewed from the direction of the normal line of the second substrate 12 (in plan view) with respect to the outline of the second substrate 12 and, on the surface of the extended portion on the second substrate 12 side, a drive IC 13 as a drive circuit and an external connecting terminal are formed. The external connecting terminal is provided with a flexible printed circuit board for liquid crystal panel (hereinafter referred to as "liquid crystal panel FPC") 14 as a wired board mounted thereon.

The liquid crystal panel FPC 14 is a wired board in the form of a flexible film configured with a predetermined conductive pattern on the surface or in the middle of a multi-layered insulative film member such as polyimide. The liquid crystal panel 10 is electrically connected to an external device, not shown, and is driven thereby via the liquid crystal panel FPC 14.

On the other hand, as shown in FIG. 2 and FIG. 3, the backlight unit 100 includes a LED-FPC 70 as a wired board, a light guide panel 40 as a light guide member, a light-shielding double-faced adhesive sheet 20 as a light-shielding member, an optical sheet 30, a reflection sheet 34, and a frame 50 as a fixing member for holding and storing these members.

The frame 50 as the fixing member has a substantially rectangular shape in the peripheral shape in plan view having the longitudinal side extending in parallel with the Y-axis, and the respective sides thereof are formed to be larger than those of the first substrate 11 of the liquid crystal panel 10 by predetermined values in plan view. The frame 50 is formed of resin, and is formed by injection molding. The frame 50 is formed with a panel fitting portion 53 on a surface on the liquid crystal panel 10 side as a recess having a bottom surface 54, which corresponds to a second sticking surface extending substantially in parallel with a XY-plane. The panel fitting portion 53 is a portion for positioning between the liquid crystal panel 10 and the frame 50 on the XY-plane, and has an inner peripheral shape so that the liquid crystal panel 10 can be fitted therein with the first substrate 11 faced toward the frame 50.

The bottom surface 54 of the panel fitting portion 53 of the frame 50 is formed with an opening 51 as a rectangular through hole in plan view. The opening 51 which is the substantially rectangular opening is formed to be larger than the image display area 10a of the liquid crystal panel 10 in the respective directions by predetermined values, and is formed in an area on the opposite side of the frame 50 having the panel fitting portion 53 formed thereon when the liquid crystal panel 10 is fitted in the panel fitting portion 53, and from which at least the image display area 10a is exposed. The opening 51 is formed with two engaging holes 52 as through holes on both side surfaces extending in parallel with the Y-axis. The frame 50 accommodates the light guide panel 40 in the opening 51 by engagement of engaging claws 41 of the light guide panel 40 with the engaging holes 52, described later. The liquid crystal panel 10 is stuck on the bottom surface 54 of the panel fitting portion 53 as an area surrounding the opening 51 of the frame 50 via the light-shielding double-faced adhesive sheet 20 as a light-shielding member, described later.

A FPC sticking surface 55 as a first sticking surface is formed on the bottom surface 54 on an area which comes on the side of a drive IC 13 of the liquid crystal panel 10 with respect to the opening 51 in plan view when, the liquid crystal panel 10 is fitted into the panel fitting portion 53. The FPC sticking surface 55 is a sticking surface for sticking the LED-FPC 70, described later, via a double-faced adhesive sheet 91, as a first adhesive layer, and is a flat portion which corresponds to the bottom surface of a recess formed on the bottom surface 54 by a thickness of the LED-FPC 70 with the double-faced adhesive sheet 31 overlaid thereon in the direction of the thickness of the frame 50 (the direction parallel with the Z-axis).

The light guide panel 40 is a substantially flat plate shaped member having a substantially rectangular shape in plan view and formed to be larger than the image display area 10a of the liquid crystal panel 10 in plan view, and is mainly formed mainly of transparent or translucent resin material having a light transmitting property.

The light guide panel 40 of the substantially flat plate shape serves to guide light entering from an entrance plane 40a, which extends in substantially parallel with an YZ-plane and is one of the side surfaces facing the driver IC 13 of the liquid crystal panel 10, distributes the light on the XY-plane in plan view, and outputs from an exit plane 40b, which is a principal plane of the liquid crystal panel 10, and is formed of acrylic resin or the like. On both side surfaces of the light guide panel 40 parallel to the Y-axis, two each of engaging claws 41 to be engaged with the engaging holes 5r2 on the frame 50 are formed so as to project therefrom.

The outline of the light guide panel 40 in plan view has a width which can be fitted into the opening 51 of the frame 50 in the direction parallel with the X-axis, and is larger than the second substrate 12 of the liquid crystal panel 10 by a predetermined value in the direction parallel with the Y-axis and is smaller than the opening 51 of the frame 50 by a predetermined value. The light guide panel 40 is positioned so that the both side surfaces extending in parallel with the Y-axis and the side surface opposite from the entrance plane 40a come into contact with the inner walls of the opening 51 in a state of being fixed in the opening 51 of the frame 50 with the engaging claws 41 engaged with the engaging holes 52.

In other words, in a state in which the light guide panel 40 is fixed in the opening 51 of the frame 50, a gap having a predetermined width is generated between die entrance plane 40a of the light guide panel 40 and the inner wail surface of the opening 51 of the frame 50. In this gap, the LEDs 900, described later, are disposed.

The LED-FPC 70 is a flexible printed circuit board having a rectangular shape in plan view having a longitudinal side extending in parallel with the X-axis. The LED-FPC 70 includes three LEDs 900 as light source members mounted in line in the longitudinal direction (the direction parallel with the X-axis) in plan view on a mount face MF as one of the principal planes. The LEDs 900 each are surface-mounted chip LEDs of so-called a side view type (side light emitting type) having a light-emitting surface LS substantially orthogonal to the mount face MF of the LED-FPC 70, and emitting light in a direction L parallel with the mount face MF. In this embodiment, the LEDs 900 are arranged so that the outgoing direction L of the light from the LEDs 900 extends substantially orthogonally with the longitudinal direction of the LED-FPC 70 in plan view. The LED 900 emits white light in this embodiment.

The LED 900 may be a type other than the white light, which emits monochromatic light having other wavelengths, and may be a so-called multi-color LED chip which includes a plurality of light emitting diodes having a plurality of different wavelengths integrated in one chip.

A connector section 71 is formed so as to extend from one end in the longitudinal direction of the LED-FPC 70 in the opposite direction from the outgoing direction L of the light from the LEDs 90. The connector section 71 is formed with a conductive terminal 72 electrically connected to the LEDs 900 at the distal end thereof, and the LEDs 900 are driven via the conductive terminal 72. The LED-FPC 70 may be formed integrally with the liquid crystal panel FPC 14 mounted to the liquid crystal panel 10.

The LED-FPC 70 is stuck to the FPC sticking surface 55 via the double-faced adhesive sheet 91 as a first adhesive layer having an adhesive force on both surfaces in a state in which the mount face MF is opposed to the FPC sticking surface 55 of the frame 50. In a state in which the LED-FPC 70 is stuck on the FPC sticking surface 55, the light-emitting surface LS of the LEDs 900 faces to and abuts against the entrance plane 40*a* of the light guide panel 40 fixed in the opening 51 of the frame 50.

The optical sheet 30 includes sheet-type members formed into the same substantially rectangular shape in plan view respectively, and is disposed on the exit plane 40*b* of the light guide panel 40. The optical sheet 30 includes a diffuser panel 33, a prism sheet X32 and a prism sheet Y31 overlaid together. The diffuser panel 33 serves to make the luminance distribution of the outputted light uniform in the direction of the XY-plane by diffusing transmitted light by the nature or the surface shape of the component material. The prism sheet X32 and the prism sheet Y31 each include prisms of substantially triangle shape in cross section extending straight along the X-axis and the Y-axis respectively arranged in parallel and have a purpose to enhance the strength of outputted light in the predetermined direction by aligning the outgoing direction of the transmitted light.

The optical sheet 30 includes the prism sheet X32 sandwiched between the diffuser panel 33 and the prism sheet Y31 so as to make the luminance distribution of light entering from the diffuser panel 33 side uniform in the direction of the XY-plane, and output the light from the prism sheet Y31 side with the outgoing direction aligned. That is, the optical sheet 30 diffuses light outputted from the exit plane of the light guide panel 40 to uniformize the same, and outputs the light in a predetermined direction.

The reflection sheet 34 is a sheet-type member having a mirror portion formed on the surface on the side of the light guide panel 40 for reflecting light. The reflection sheet 34 is stuck to the surface of the light guide panel 40 opposite from the exit plane 40*b* with the mirror portion opposed thereto. The reflection sheet 34 has a function to enhance the intensity of the light outputted from the exit plane of the light guide panel 40 by reflecting the light outputted from the surface opposite from the exit plane 40*b* of the light guide panel 40 by the mirror portion.

It is also possible to configure the backlight unit 100 having no optical sheet 30 by providing the light guide panel 40 with the same function as the optical sheet 30. It is also possible to configure the backlight unit 100 having no reflection sheet 34.

The light-shielding double-faced adhesive sheet 20 is a resin film-type member having substantially the same peripheral shape as the first substrate 11 of the liquid crystal panel 10 in plan view, and is formed with a layer having a light-shielding property, and a layer having an adhesive force on both surfaces of a transparent film-type base material. In other words, the light-shielding double-faced adhesive sheet 20 has substantially the same shape as the bottom surface 54 of the panel fitting portion 53 of the frame 50 in plan view.

The light-shielding double-faced adhesive sheet 20 has a light-transmissive portion 21 which is a portion where the transparent base material is exposed on both surfaces, and a light-shielding portion 22, which is a light-shielding member having a light-shielding property, formed therearound. The light-transmissive portion 21 is formed to be larger than the image display area 10*a* of the liquid crystal panel 10 by a predetermined value in plan view. On the other hand, the light-shielding portion 22 is formed in an area of the light-shielding double-faced adhesive sheet 20 other than the light-transmissive portion 21 so as to surround the light-transmissive portion 21.

Formed on a surface 22*a* of the light-shielding portion 22 of the light-shielding double-faced adhesive sheet 20 on the light-entering side, which is the surface on the side of the frame 50 as the fixing member, is a white or silver reflection layer which has a high reflection power for visible light is formed on the transparent base material by printing or deposition. Then, formed on the reflection layer is a light-shielding adhesive layer 22*c* formed of adhesive agent having an adhesive force.

On the other hand, formed on a surface 22*b* of the light-shielding portion 22 of the light-shielding double-faced adhesive sheet 20 on the light-exit side, which is the surface on the side of the liquid crystal panel 10 is a light-shielding layer being black or the like having a lower reflection power for the visible light and having a light-shielding property for visible light formed on the transparent base material by printing or deposition. Furthermore, formed on the light-shielding layer is a fourth adhesive layer formed of adhesive agent having an adhesive force for the liquid crystal panel 10. In other words, the light-shielding double-faced adhesive sheet 20 has an adhesive property on both sides in the light-shielding portion 22 on the frame-shaped peripheral portion.

The reflection layer and the light-shielding layer formed on the light-shielding portion 22 of the light-shielding double-faced adhesive sheet 20 is not limited to the embodiment shown above as long as a layer having a light-shielding property for visible light is formed at least on one of the surfaces of the light-shielding portion 22 of the light-shielding double-faced adhesive sheet 20. The light-shielding double-faced adhesive sheet 20 may be a double-faced adhesive sheet having the light-shielding property formed on a frame having the light-transmissive portion 21 cutout as a through hole.

The light-shielding double-faced adhesive sheet 20 is interposed between the frame 50 in which the LED-FPC 70, the light guide panel 40, the optical sheet 30, and the reflection sheet 34 are stored and the liquid crystal panel 10 for sticking both members together. At this time, light outputted from the side of the optical sheet 30 on the side of the liquid crystal panel 10 passes only through the light-transmissive portion 21 of the light-shielding double-faced adhesive sheet 20, and enters the image display area 10*a* of the liquid crystal panel 10. Therefore, there is no possibility that the light emitted from the LEDs 900 passes, for example, through the translucent portion of the LED-FPC 70 and directly enters the image display area 10*a* of the liquid crystal panel 10. Since the surface 22*a* of the light-shielding portion 22 of the light-entering side formed to be white or silver, the light emitted from the LEDs 900 and passing through the LED-FPC 70 is reflected from the surface 22*a* on the light-entering side, and enters the light guide panel 40. Therefore, loss of light emitted from the LEDs 900 is reduced.

In this manner, the light-shielding double-faced adhesive sheet 20 has a light-shielding function to prevent stray light from entering into the image display area 10a of the liquid crystal panel 10 through an area other than the predetermine area or angle and a sticking function to stick and fix the liquid crystal panel 10 and the backlight unit 100 together.

Provided between the light-shielding double-faced adhesive sheet 20 and the LED-FPC 70 is a low-bond strength adhesive sheet 80 formed with a low-bond strength adhesive layer 80a as a low-bond strength adhesive portion. The low-bond strength adhesive sheet 80, described later in detail, is a sheet type member having a shape to cover the LED-FPC 70 partly or entirely, which is a predetermined area thereof, in plan view, and has the low-bond strength adhesive layer 80a having an adhesive force at least on the surface facing the LED-FPC 70.

A second adhesive force F2, which is an adhesive force of the low-bond strength adhesive layer 80a of the low-bond strength adhesive sheet 80 is set to be lower than a first adhesive force F1 as an adhesive force between the aforementioned double-faced adhesive sheet 91 and the surface of the LED-FPC 70, and to be also lower than a third adhesive force F3 as an adhesive force between the light-shielding adhesive layer 22c of the surface 22a of the light-shielding double-faced adhesive sheet 20 on the light-entering side and a surface 80b of the low-bond strength adhesive sheet 80 on the opposite side from the low-bond strength adhesive layer 80a.

In the backlight unit 100 in the embodiment having the configuration shown above, light emitted from the light-emitting surfaces LS of the LEDs 900 in the outgoing direction L enters from the entrance plane 40a into the light guide panel 40. The light entering the light guide panel 40 is guided in the light guide panel 40, diffused, and outputted from the exit plane 40b in a plane. The luminance distribution of the light outputted from the light guide panel 40 in the direction of the XY-plane is made substantially even by the optical sheet 30, and outputted as the illumination light toward the liquid crystal panel 10.

As shown in FIG. 1, the liquid crystal display apparatus 500 in this embodiment is configured in such a manner that the liquid crystal panel 10 is fitted into the panel fitting portion 53 of the backlight unit 100 and, in this state, is stuck by the light-shielding double-faced adhesive sheet 20. Therefore, according to the liquid crystal display apparatus 500 in this embodiment, the image display area 10a of the liquid crystal panel 10 disposed in the outgoing direction of the illumination light is illuminated by the illumination light outputted from the backlight unit 100 having the luminance distribution substantially uniform in the direction of the XY-plane.

Figure 4:
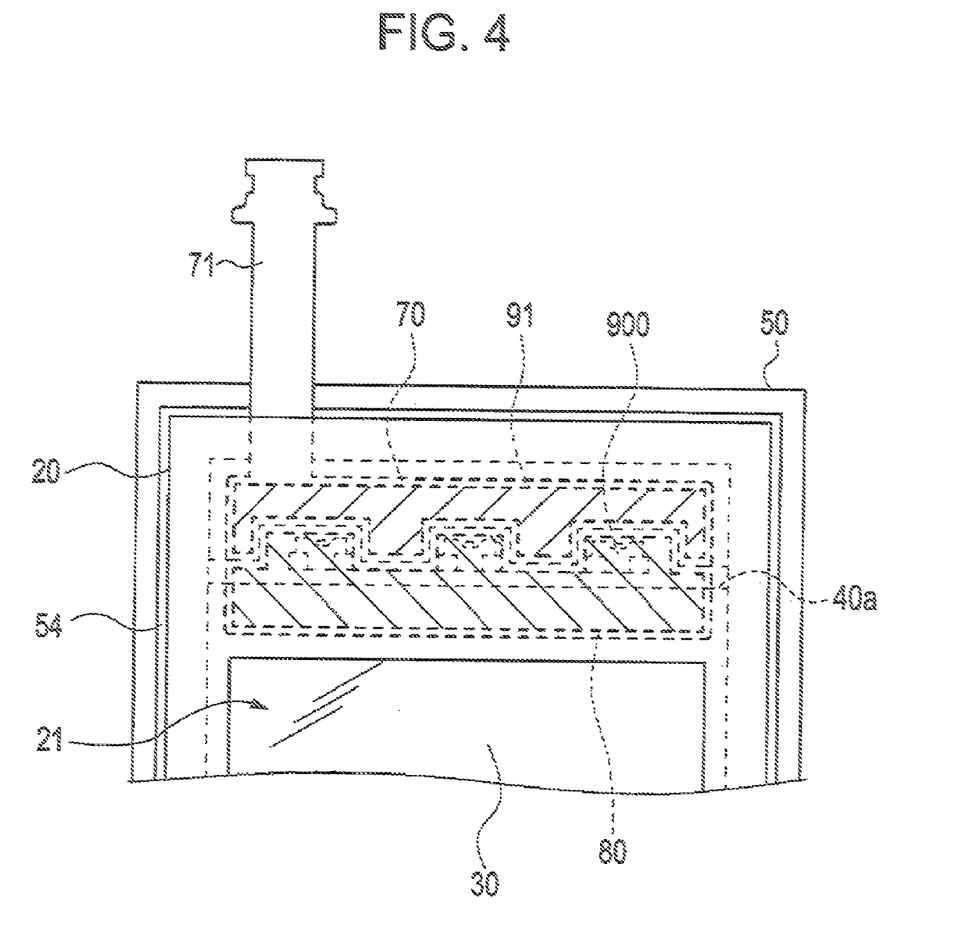
FIG. 4 is a plan view of a backlight unit.
Figure 5A:
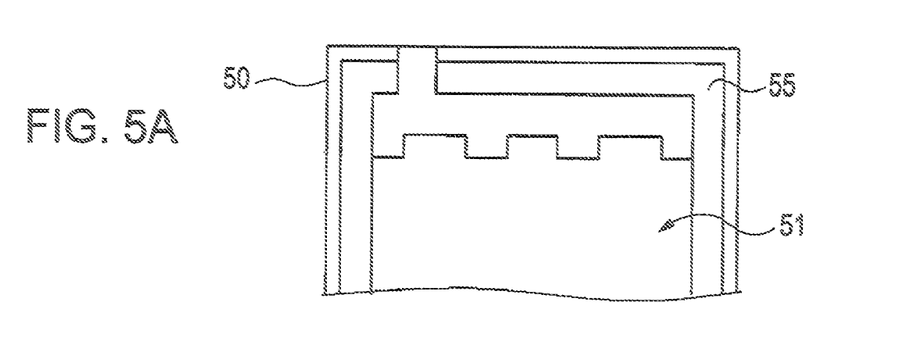
FIGS. 5A to 5C illustrate assembly of the backlight unit in sequence.
Figure 5B:
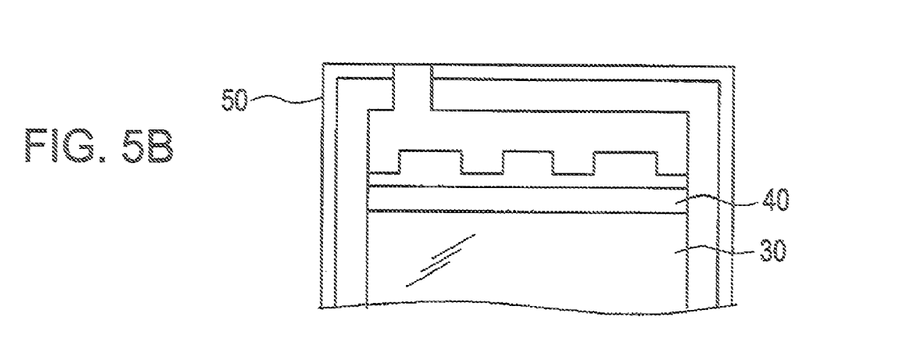
Figure 5C:
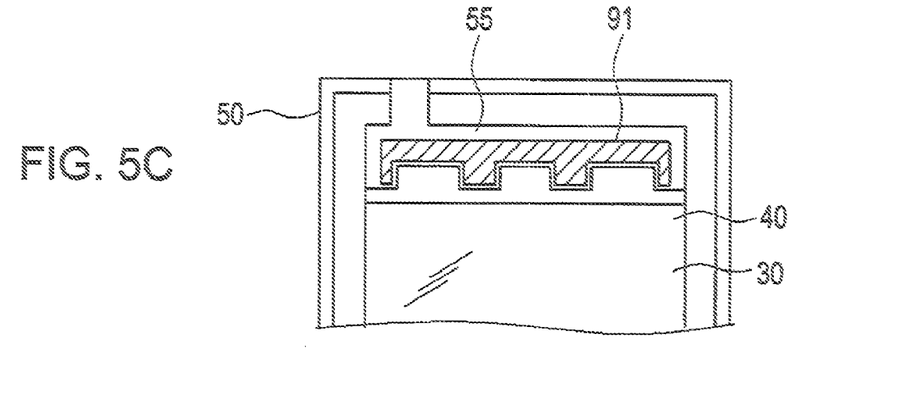
Figure 6A:
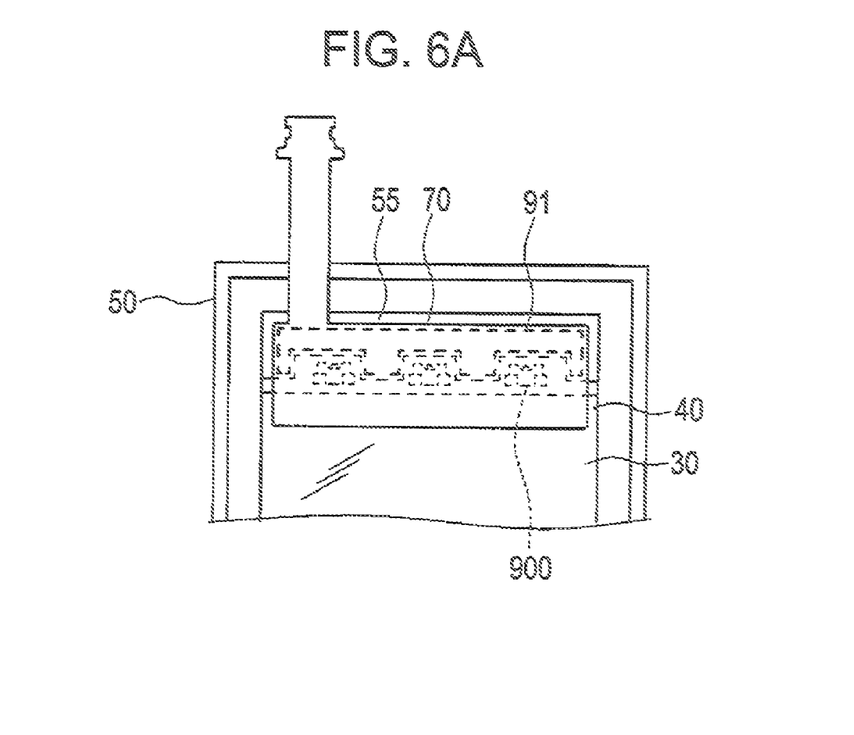
FIGS. 6A and 6B illustrate assembly of the backlight unit in sequence.
Figure 6B:
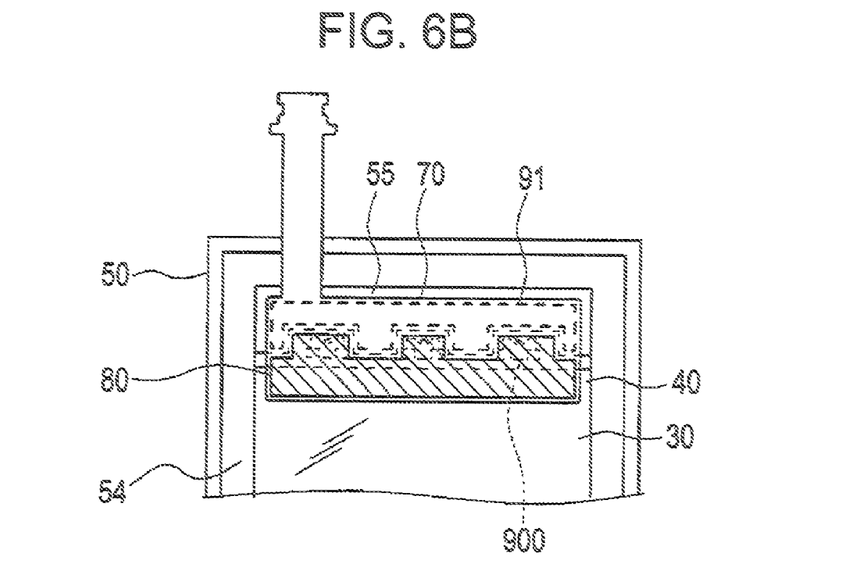

Referring now to FIGS. 4 to 6, configurations of the LED-FPC 70, the low-bond strength adhesive sheet 80, and the light-shielding double-faced adhesive sheet 20 stuck to the frame 50 as the fixing member of the backlight unit 100 and a method of sticking and fixing these members will be described. FIG. 4 is a plan view of the backlight unit 100. FIGS. 5A to 5C and FIGS. 6D and 6E illustrate assembly of the backlight unit 100 in sequence.

As shown in FIG. 5A, the frame 50 is formed with a recess on the side wall surface of the opening 51 of on the side of the FPC sticking surface 55 at a position where the LEDs 900 are disposed when the LED-FPC 70 is fixed on the FPC sticking surface 55. The recess is a space in which the LEDs 900 are stored in the case in which the LED-FPC 70 is fixed to the FPC sticking surface 55.

As shown in FIG. 5B, the light guide panel 40 is fixed in the opening 51. The optical sheet 30 is disposed on the exit plane 40b of the light guide panel 40, and the reflection sheet 34 is stuck to a surface opposite from the exit plane 40b.

As shown in FIG. 5C, the double-faced adhesive sheet 91 is stuck on the FPC sticking surface 55 of the frame 50 (the area represented by oblique hatching inclining upward to the right in the drawing). The double-faced adhesive sheet 91 has a shape substantially the same as an area that the mount face MF as one of the principal planes of the LED-FPC 70 and the FPC sticking surface 55 oppose to each other.

As shown in FIG. 6A, the LED-FPC 70 is stuck and fixed to the FPC sticking surface 55 of the frame 50 with the mount face MF opposed to the FPC sticking surface 55 via the double-faced adhesive sheet 91. Accordingly, the LEDs 900 are stored in the recess of the opening 51 of the frame 50, and the light-emitting surface LS is disposed so as to oppose the entrance plane 40a of the light guide panel 40.

Subsequently, as shown in FIG. 6B, the low-bond strength adhesive sheet 80 is stuck on the principal plane of the LED-FPC 70 on the opposite side from the mount face MF as the other principal plane with the low-bond strength adhesive layer 80a opposed to the LED-FPC 70 (the area represented by oblique hatching inclining downward to the right in the drawing). The low-bond strength adhesive sheet 80 is formed into a shape which does not overlap with the area in which the double-faced adhesive sheet 91 is formed when viewed in the direction of the normal line of the principal plane of the LED-FPC 70 on the opposite side from the mount face MF. In this manner, by sticking the low-bond strength adhesive sheet 80 not on the light-shielding double-faced adhesive sheet 20, but firstly on the LED-FPC 70, positioning of the low-bond strength adhesive sheet 80 is facilitated.

Subsequently, the light-shielding double-faced adhesive sheet 20 is stuck on the bottom surface 54 of the panel fitting portion 53 of the frame 50. At this time, the FPC sticking surface 55, the LED-FPC 70 and the low-bond strength adhesive sheet 80 are covered by the light-shielding portion 22 of the light-shielding double-faced adhesive sheet 20 when viewed in the direction of the normal line of the surface of the LED-FPC 70 on the opposite side from the mount face MF. Accordingly, the backlight unit 100 shown in FIG. 4 is completed.

Figure 7:
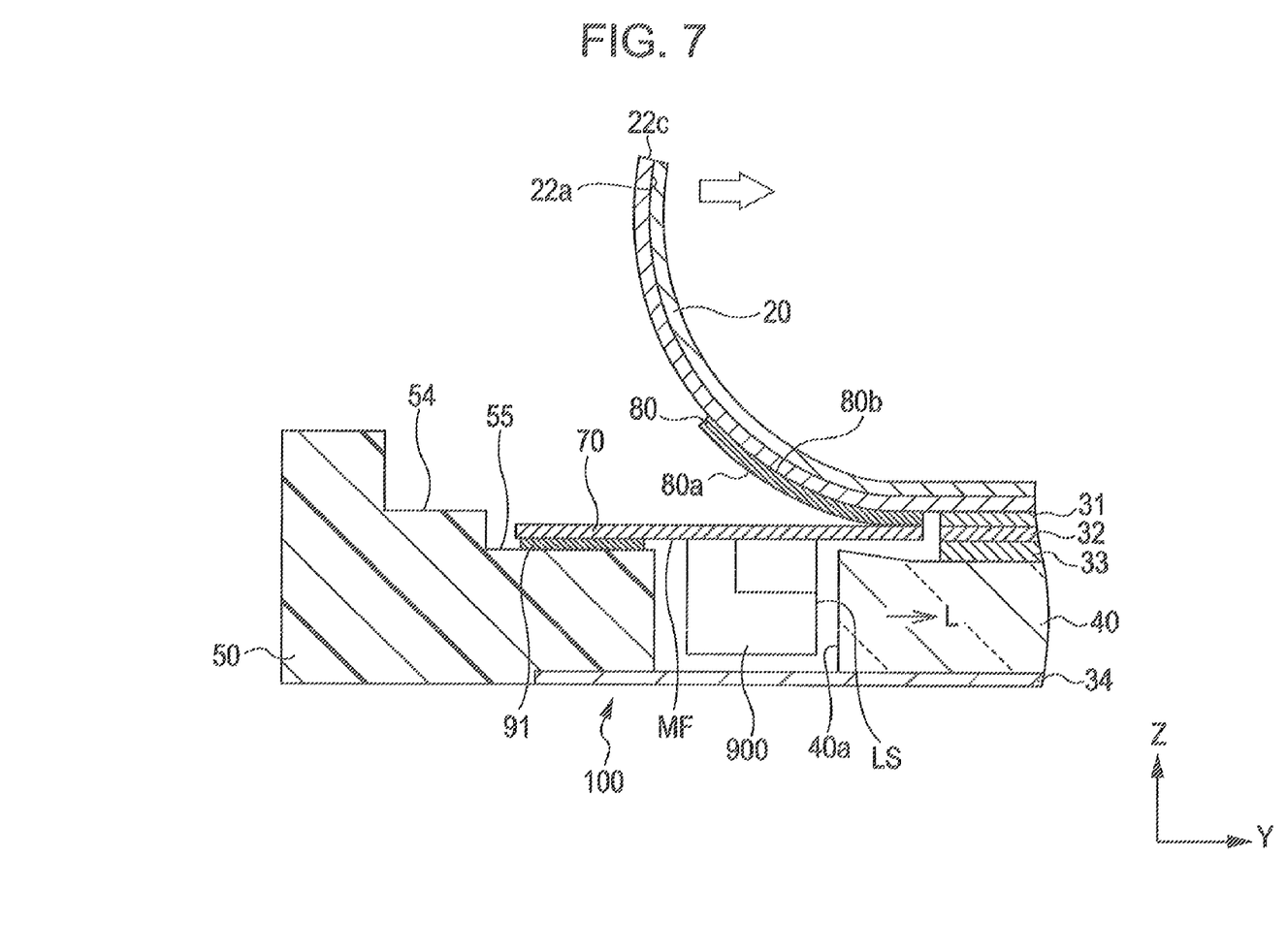
FIG. 7 is an explanatory drawing showing an operation when peeling off a light-shielding double-faced adhesive sheet.

According to the backlight unit 100 and the liquid crystal display apparatus 500 in this embodiment having a configuration shown above, the following effects and advantages are demonstrated when peeling off the LED-FPC portion 210 from the predetermined sticking surfaces during rework. FIG. 7 is an explanatory drawing showing an operation of peeling off the light-shielding double-faced adhesive sheet 20 in this embodiment.

In the backlight unit 100 in this embodiment, the low-bond strength adhesive sheet 80 is interposed between the surface of the LED-FPC 70 on the opposite side from the mount face MF and the light-shielding double-faced adhesive sheet 20 disposed so as to cover the surface. When peeling off the light-shielding double-faced adhesive sheet 20 from the bottom surface 54 of the frame 50 and the LED-FPC 70 as shown in FIG. 7, since the first adhesive force F1 which is the adhesive force between the double-faced adhesive sheet 91 and the surface of the LED-FPC 70 is set to be higher than the second adhesive force F2 as the adhesive force of the low-bond strength adhesive layer 80a of the low-bond strength adhesive sheet 80 with respect to the surface of the LED-FPC 70, the LED-FPC 70 is not peeled off from the FPC sticking surface 55, and remains on the frame 50 side.

That is, the low-bond strength adhesive sheet 80 interposed between the surface of the LED-FPC 70 on the opposite side from the mount face MF and the light-shielding adhesive layer 22c of the light-shielding double-faced adhesive sheet 20 has a function to weaken die adhesive force between the light-shielding double-faced adhesive sheet 20 and the LED-FPC 70.

At this time, since the adhesive force F2 of the low-bond strength adhesive layer 80a is set to be lower than the third adhesive force F3 which is the adhesive force with respect to the surface 80b on the opposite side from the low-bond strength adhesive layer 80a of the low-bond strength adhesive sheet 80, the low-bond strength adhesive sheet 80 is stuck to the light-shielding adhesive layer 22c of the light-shielding double-faced adhesive sheet 20, and is peeled off from the LED-FPC 70 together with the light-shielding double-faced adhesive sheet 20.

In other words, the adhesive layer, which is a second adhesive layer including the light-shielding adhesive layer 22c, and the low-bond strength adhesive layer 80a as the low-bond strength adhesive portion of the low-bond strength adhesive sheet 80 stuck on the light-shielding adhesive layer 22c of the surface 22a of the light-shielding double-faced adhesive sheet 20 on the light-entering side, which is the surface opposing the frame 50.

Therefore, according to the backlight 100 in this embodiment, the LED-FPC 70 is prevented from being pulled by the adhesive force of the light-shielding double-faced adhesive sheet 20 when peeling off the light-shielding double-faced adhesive sheet 20 for rework and hence rising thorn the FPC sticking surface 55 or being peeled off with the light-shielding double-faced adhesive sheet 20. Therefore, the LED-FPC 70 is prevented from being bent during rework, and hence an excessive stress is not applied to joint portions between terminals of the LEDs 900 and the LED-FPC 70.

Therefore, application of an excessive stress applied to the joint portions between the terminals of the LEDs and the FPC when the FPC on which the LEDs are mounted is bent for rework is prevented and hence occurrence of separation or cracking may be prevented.

In this embodiment, the low-bond strength adhesive sheet 80 is disposed in the area which does not overlap with the area in which the double-faced adhesive sheet 91 is formed when viewed in the direction of the normal line of the surface of the LED-FPC 70 on the opposite side from the mount face MF (in plan view). That is, the low-bond strength adhesive sheet 80 does not cover entirely the surface of the LED-FPC 70 on the opposite side from the mount face MF but is disposed only in the predetermined area. This is because the adhesive force between the LED-FPC 70 and the FPC sticking surface 55 in the area in which the LED-FPC 70 is stuck to the FPC sticking surface 55 with the double-faced adhesive sheet 91 in plan view is sufficiently higher than a force to separate the LED-FPC 70 and the FPC sticking surface 55 by being pulled by the light-shielding double-faced adhesive sheet 20.

That is, it is not necessary to interpose the low-bond strength adhesive sheet 80 between the LED-FPC 70 and the light-shielding double-faced adhesive sheet 20 in the area in which the LED-FPC 70 is stuck to the FPC sticking surface 55 via the double-faced adhesive sheet 91 in plan view. In this manner, by reducing the surface area of the low-bond strength adhesive sheet 80 in plan view as much as possible, the surface area to stick the LED-FPC 70 and the light-shielding double-faced adhesive sheet 20 may be increased. Therefore, in this embodiment, the liquid crystal panel 10 to be stuck to the backlight unit 100 via the light-shielding double-faced adhesive sheet 20 can be stuck and fixed further firmly.

According to the liquid crystal display apparatus 500 provided with the backlight unit 100 as described thus far, the number of defective units to be wasted due to failed rework during the manufacturing process may be reduced and, consequently, the liquid crystal display apparatus may be manufactured at low cost.

The low-bond strength adhesive sheet 80 may be formed into a shape that covers the entire LED-FPC 70 in plan view, and interposed between the light-shielding double-faced adhesive sheet 20 and the LED-FPC 70. In this configuration, the light-shielding double-faced adhesive sheet 20 can be peeled off from the LED-FPC 70 further easily for rework.

In this embodiment, the adhesive force between the light-shielding double-faced adhesive sheet 20 and the LED-FPC 70 is weakened by interposing the low-bond strength adhesive sheet 80 between the LED-FPC 70 and the light-shielding double-faced adhesive sheet 20. However, it may be achieved in other modes. For example, by forming the adhesive layer on the surface 22a of the light-shielding double-faced adhesive sheet 20 on the light-entering side not in the area which overlaps with the LED-FPC 70 in plan view, the adhesive force between the light-shielding double-faced adhesive sheet 20 and the LED-FPC 70 may be weakened or eliminated without using the low-bond strength adhesive sheet 80. That is, it is also possible to form a non-adhesive portion having no adhesive property in the area of the light-shielding double-faced adhesive sheet 20 opposing the LED-FPC 70. In this configuration, the invention is accomplished at low cost without increasing the number of components of the backlight unit 100.

The invention is not limited to the above-described embodiments, and various modifications may be made without departing from the scope or the sprit of the invention which is understood from the appended claims and the entire description. Illumination devices and liquid crystal display apparatus including such modifications are included in the scope of the invention.

For example, in the above-described embodiments, the invention is applied to the backlight unit as the illumination device of the transmissive liquid crystal panel. However, it may also be applied to a front light unit which is an illumination device for illuminating the reflective liquid crystal panel from the observer side.

What is claimed is:

1. An illumination device comprising:
   a wired board having flexibility and including a light source member mounted on one of principal planes;
   a light-shielding member disposed so as to cover at least part of the other principal plane of the wired board on the opposite side from the one principal plane and having at least partly a light-shielding property;
   a fixing member having first and second sticking surfaces to which the wired board and the light-shielding member are stuck respectively, a first adhesive layer being interposed between the one principal plane of the wired board and the first sticking surface of the fixing member, having an adhesive property with respect to both of the one principal plane of the wired board and the first sticking surface, and having a first adhesive force with respect to the one principal plane, and a second adhesive layer being disposed on a surface opposing the fixing member of the light-shielding member, and having a portion having an adhesive property with respect to both of the light-shielding member and the second sticking surface and a portion having an adhesive property for both of the light-shielding member and the other principal plane of the wired board, wherein the second adhesive layer includes a non-adhesive portion having no adhesive property with respect to at least a portion of the other principal plane.

2. The illumination device according to claim 1, wherein the area in which the non-adhesive portion of the second adhesive layer is formed, is disposed so as not to overlap with the area in which the first adhesive layer is formed when viewed in the direction of the normal line of the other principal plane of the wired board.

3. The illumination device according to claim 1, wherein the second adhesive layer includes a light-shielding adhesive layer having an adhesive property and being formed on the surface of the light-shielding member which opposes the fixing member, and a low-bond strength adhesive layer in the form of a low-bond strength adhesive sheet as a sheet-type member being interposed at least partly in an area where the light-shielding adhesive layer and the other principal plane of the wired board are opposed to each other and being formed with the non-adhesive portion on the surface opposing the other principal plane of the wired board.

4. A liquid crystal display apparatus comprising the illumination apparatus according to claim 1.

5. An illumination device comprising:
   a wired board having flexibility and including a light source member mounted on one of principal planes;
   a light-shielding member disposed so as to cover at least part of the other principal plane of the wired board on the opposite side from the one principal plane and having at least partly a light-shielding property;
   a fixing member having first and second sticking surfaces to which the wired board and the light-shielding member are stuck respectively, a first adhesive layer being interposed between the one principal plane of the wired board and the first sticking surface of the fixing member, having an adhesive property with respect to both of the one principal plane of the wired board and the first sticking surface, and having a first adhesive force with respect to the one principal plane, and a second adhesive layer being disposed on a surface opposing the fixing member of the light-shielding member, and having a portion having an adhesive property with respect to both of the light-shielding member and the second sticking surface and a portion having an adhesive property for both of the light-shielding member and the other principal plane of the wired board,
   wherein the second adhesive layer includes a low-bond strength adhesive portion having a second adhesive force lower than the first adhesive force at least in a portion having an adhesive force for both the light-shielding member and the other principal plane of the wired board.

6. The illumination device according to claim 5, wherein the area in which the low-bond strength adhesive portion of the second adhesive layer is formed, is disposed so as not to overlap with the area in which the first adhesive layer is formed when viewed in the direction of the normal line of the other principal plane of the wired board.

7. The illumination device according to claim 5, wherein the second adhesive layer includes a light-shielding adhesive layer having an adhesive property and being formed on the surface of the light-shielding member which opposes the fixing member, and a low-bond strength adhesive layer in the form of a low-bond strength adhesive sheet as a sheet-type member being interposed at least partly in an area where the light-shielding adhesive layer and the other principal plane of the wired board are opposed to each other and being formed with the low-bond strength adhesive portion on the surface opposing the other principal plane of the wired board.

8. A liquid crystal display apparatus comprising the illumination apparatus according to claim 5.

* * * * *